(12) United States Patent
Omeragic et al.

(10) Patent No.: US 8,489,375 B2
(45) Date of Patent: Jul. 16, 2013

(54) FORMATION MODELING WHILE DRILLING FOR ENHANCED HIGH ANGLE FOR HORIZONTAL WELL PLACEMENT

(75) Inventors: Dzevat Omeragic, Lexington, MA (US); Tarek M. Habashy, Burlington, MA (US); Valery Polyakov, Brookline, MA (US); Raymond Kocian, Osprey, FL (US); Yong-Hua Chen, Belmont, MA (US); Sofia Davydycheva, Sugar Land, TX (US); Raphael Altman, College Station, TX (US); Carlos Maeso, Kuala Lumpur (MY); Douglas Hupp, Anchorage, AK (US)

(73) Assignee: Schlumberger Technology Corporation, Sugar Land, TX (US)

( * ) Notice: Subject to any disclaimer, the term of this patent is extended or adjusted under 35 U.S.C. 154(b) by 524 days.

(21) Appl. No.: 12/738,225

(22) PCT Filed: Sep. 8, 2008

(86) PCT No.: PCT/US2008/075568
§ 371 (c)(1),
(2), (4) Date: Apr. 15, 2010

(87) PCT Pub. No.: WO2009/055152
PCT Pub. Date: Apr. 30, 2009

(65) Prior Publication Data
US 2011/0106514 A1 May 5, 2011

Related U.S. Application Data

(60) Provisional application No. 60/981,762, filed on Oct. 22, 2007.

(51) Int. Cl.
*G06G 7/48* (2006.01)

(52) U.S. Cl.
USPC .................................................. 703/10

(58) Field of Classification Search
USPC ... 703/10; 702/6, 9; 33/304; 367/37; 324/303
See application file for complete search history.

(56) References Cited

U.S. PATENT DOCUMENTS

| | | | |
|---|---|---|---|
| 6,594,584 B1 | 7/2003 | Omeragic et al. | |
| 2004/0140801 A1* | 7/2004 | Schoen et al. | 324/303 |

(Continued)

OTHER PUBLICATIONS

Polyakov et al, "Interactive Log Simulation and Inversion on the Web," SPE 90909, SPE Annual Technical Conference & Exhibition, Houston TX (Sep. 26-29, 2004).

(Continued)

*Primary Examiner* — Kandasamy Thangavelu
(74) *Attorney, Agent, or Firm* — Kenneth Liu; Daria P. Fonseca

(57) ABSTRACT

LWD measurements to be used for proactive well placement while drilling a high angle or horizontal wellbore in a reservoir are defined. An initial reservoir model is provided and a section is extracted for a planned wellbore trajectory. A secondary model is generated for the planned trajectory. An area of interest is identified where statistical uncertainty is high. Possible causes of the statistical uncertainty are identified that are not present in the initial reservoir model. A set of parameters are defined based on the possible causes of statistical uncertainty. The area of interest is logged with LWD tool. Sensitivities of the LWD tool response to a subset of parameters are evaluated by performing tertiary model for a range of the subset of parameters. The most sensitive parameters from the subset of parameters and corresponding measurements are identified. LWD measurements are defined based on the most sensitive parameters.

39 Claims, 4 Drawing Sheets

U.S. PATENT DOCUMENTS

| | | | |
|---|---|---|---|
| 2004/0158997 A1* | 8/2004 | Tang | 33/304 |
| 2006/0074561 A1* | 4/2006 | Xia et al. | 702/6 |
| 2006/0241867 A1 | 10/2006 | Kachuk et al. | |
| 2006/0285437 A1* | 12/2006 | Sinha et al. | 367/37 |
| 2007/0219723 A1* | 9/2007 | Tabarovsky et al. | 702/9 |
| 2007/0255545 A1* | 11/2007 | Pita et al. | 703/10 |

OTHER PUBLICATIONS

Razib et al, "Horizontal Well Simulation in the Baram South Area, Offshore Sarawak, Malaysia," SPE 29305, SPE Asia Pacific Oil & Gas Conference, Kuala Lumpur MY (Mar. 20-22, 1995).

Landa et al, "Sensitivity Analysis of Petrophysical Properties Spatial Distributions, and Flow Performance Forecasts to Geostatistical Parameters Using Derivative Coefficients" SPE Journal 4 (3), pp. 251-259 (Sep. 1999).

Lepine et al, "Uncertainty Analysis in Predictive Reservoir Simulation," SPE 90909, SPE Annual Technical Conference & Exhibition, Houston TX (Sep. 26-29, 2004).

Auken et al, Piecewise 1D Laterally Constrained Inversion of Resistivity Data Geophysical Prospecting 53, pp. 497-506 (2005).

* cited by examiner

FORMATION MODELING WHILE DRILLING FOR ENHANCED HIGH ANGLE FOR HORIZONTAL WELL PLACEMENT

CROSS REFERENCE TO RELATED APPLICATIONS

This application claims priority to U.S. Provisional Application Ser. No. 60/981,762, filed on Oct. 22, 2007 and entitled "Well Placement in Complex Reservoirs and Improved 3D Structure Characterization in Horizontal Wells using Azimuthal Measurements while Drilling."

BACKGROUND

1. Technical Field

This disclosure relates generally to oil and gas well logging and directional drilling. More specifically, techniques are disclosed for enhancing well placement using logging while drilling (LWD) tool data to update or change the reservoir model while drilling, or after drilling. Continuously updating the reservoir model enhances the ability to geo-steer the drill string to the desired location in high angle or horizontal (HA/HZ) wellbores. The disclosed techniques include improved 1D, 2D, 2.5D and 3D modeling methods while drilling using directional electromagnetic, borehole imaging and bit resistivity data. Methods for processing such electromagnetic data are used to model and visualize the layered subterranean earth formations surrounding the tool. The disclosed methods can be used in the well placement planning process to evaluate and select the best measurements to be used in real-time and prepare for unaccounted possible effects. Other measurements and high performance computing modeling methods for processing those measurements are disclosed as well. A high performance computing (HPC) infrastructure and modeling/inversion algorithm library or database is also disclosed. The disclosed methods are not limited to high-angle and horizontal wells and are applicable to vertical and deviated wells and related well placements. The disclosed methods may also apply to related (after-drilling) applications, be they LWD or wireline.

2. Description of the Related Art

Wellbores drilled through earth formations to extract petroleum are frequently drilled along a substantially horizontal trajectory to increase the drainage area, or the length of the wellbore that is disposed within the reservoir. Often, the terms high angle/horizontal or HA/HZ, are used with these types of wellbores. Because petroleum rich reservoirs are frequently located in layered subterranean earth formations, the position or placement of the substantially horizontal wellbore relative to the upper and lower boundaries of the reservoir will have a material effect on the productivity of the wellbore. This disclosure, in addition to HA/HZ wellbores, is more generally directed to vertical and deviated wellbores.

An alternative to wireline logging techniques is the collection of data on downhole conditions during the drilling process. By collecting and processing such information during the drilling process, the driller can modify or correct key steps of the operation to optimize well performance. Schemes for collecting data of downhole conditions and movement of the drilling assembly during the drilling operation are known as measurement-while-drilling ("MWD"). Similar techniques focusing more on measurement of formation parameters than on movement of the drilling assembly are known as logging-while-drilling ("LWD"). However, the terms MWD and LWD are often used interchangeably, and the use of either term in this disclosure will be understood to include both the collection of formation and borehole information, as well as data on movement and placement of the drilling assembly.

Recent introduction of deep directional electro-magnetic (EM) logging tools has revolutionized wellbore placement. Along with real-time borehole imaging technology, the new measurements enable proactive geo-steering, which allow the driller to maintain the well position within the reservoir of interest or "pay zone." As a result, wellbores are now routinely steered along a path defined by observed reservoir boundaries and fluid contacts rather than by preconceived geometries. Data from the MWD or LWD tools are used for real-time prediction and visualization of the layer structure of the formation surrounding the tool or drill string.

Such real-time visualization allows operators to control the direction of the wellbore drilling operations in order to place or "land" the wellbore in a particular section of a reservoir. Wellbore placement optimization results in increased production by minimizing gas or water breakthrough, reducing sidetracks, and managing drilling risk through better control of the wellbore placement.

Electromagnetic (EM) induction and propagation-style logging tools are well suited for these geo-steering applications because of their relatively large lateral depth of investigation into the surrounding formation. Directional EM LWD tools are available, such as Schlumberger's PERISCOPE™ deep imaging LWD tools, which incorporate multiple tilted and transverse antennas in the drilling collar. The non-axial antennae obtain directional electromagnetic measurements that are used to determine distance and azimuthal orientation of formation boundaries in any type of mud. These measurements are transmitted up-hole in real-time and displayed on a graphical interface (visualized) to provide information on distance to boundaries, formation resistivity and orientation. These EM LWD tools also include short coil spacings for shallow depths of investigation (DOI) or the formation layers near the tool as well as longer coil spacings for deep DOIs or properties of formation layers farther away from the tool. Schlumberger's GEOVISION™ resistivity at the bit tools can be used for geological analysis as well as geo-steering. One component of bit resistivity measurements (also referred to as resistivity-at-the-bit or "RAB") is azimuthally focused sensors for wellbore positioning.

Current geo-steering solutions provide for two and three dimensional modeling and visualization of both shallow and deep formation properties (see commonly owned U.S. Pat. Nos. 6,594,584 and 7,366,616, incorporated herein by reference). However, the following common scenarios can adversely affect the modeling of a formation: nearby boundaries and faults; cross-bedding; layering; eccentralization of the tool in the borehole; effects of invaded fracture swarms with the presence of nearby boundaries; borehole size variation, shape and mud properties; and others. One or more of these scenarios can cause inconsistencies in model-based interpretations, be they in real-time or post-drilling. Accordingly, improved modeling techniques are needed for enhancing the ability to properly land and drill wellbores in relatively thin reservoirs.

SUMMARY OF THE DISCLOSURE

In satisfaction of the aforenoted needs, methods for three-dimensionally characterizing a reservoir while drilling a high angle or horizontal wellbore through the reservoir are disclosed. One disclosed method includes using an initial reservoir model for the reservoir. A section of the initial reservoir model is extracted for a planned trajectory of the wellbore. A secondary model is generated by performing secondary modeling for at least part of the planned trajectory. An area of interest is identified within the secondary model where statistical uncertainty is high. Possible causes of the statistical uncertainty are identified for the area of interest within the secondary model that are not present or accounted for in the initial reservoir model. The possible causes of statistical uncertainty may be selected from the group consisting of nearby bed boundaries, nearby formation layers, nearby faults, non-parallel bedding, properties of wellbore fluid invasion, wellbore properties and nearby fractures. A set of parameters for the area of interest are defined that are based on the possible causes of statistical uncertainty. The area of interest is logged with at least one LWD (or MWD) tool, be it in the early part of the wellbore of interest or in a separate wellbore. Sensitivities of the tool response to a subset of the set of parameters are evaluated by performing at least one tertiary model for a range of the subset of parameters. The most sensitive parameters from the subset of parameters and corresponding measurements are identified. One or more real-time LWD measurements to be used for proactive well placement along the planned trajectory are identified and are based on the most sensitive parameters.

In a refinement, the disclosed method further includes: identifying characteristic patterns of tool responses to changes in the subset of parameters; generating a data base of measurement responses to be used in real-time well placement based on measurement sensitivity; and defining a subset of measurements while drilling to be used in real-time interpretation as the wellbore is drilled though the reservoir.

In another refinement, the extracted section is one-dimensional, two-dimensional or three dimensional.

In a related refinement, the extracted section is at least partially defined by a depth of investigation (DOI) of the LWD (or MWD) tool.

In another refinement, the secondary model is generated by performing LWD tool response modeling for at least part of the planned trajectory.

In another refinement, the area of interest within the secondary model is further characterized as an area where the LWD tool response does not match the secondary model.

In another refinement, the defining of the possible causes of the statistical uncertainty in area of interest within the secondary model and the defining of the set of parameters for the area of interest based on the possible causes of statistical uncertainty further comprises selecting the tertiary model from the group consisting of nearby bed boundaries, nearby formation layers (be they parallel or non-parallel), nearby faults, properties of wellbore fluid invasion, oil water contact (OWC), gas oil contact (GOC), wellbore properties and nearby fractures.

In a refinement, the tertiary model is selected from a plurality of other models by: a) performing one of the other models for the range of the subset of parameters to generate a first result; b) changing at least one of the most sensitive parameters; c) performing the one of the other models for the range of the subset of changed parameters to generate a second result; d) comparing the first and second results; e) if the first and second results do not agree to within a predetermined tolerance level, selecting another model from the plurality of models and repeating parts (a) through (d) until the first and second results agree within the predetermined tolerance level.

In a refinement, the initial reservoir model is modified by incorporating the selected tertiary model therein.

In a refinement, the modifying of the initial reservoir model further comprises at least one change selected from the group consisting of: changing a position or shape of a formation layer boundary; changing a position or shape of a fault; changing a layer property; changing a cell property; defining a heterogeneity in area of interest; inserting new boundaries; changing invasion properties; changing shapes and properties of the borehole; inserting new faults; defining a new OWC contact; and defining a new GOC contact.

In a refinement, the initial reservoir model is a seismic reservoir model.

In a refinement, the at least one LWD tool comprises a resistivity imaging tool and a resistivity mapping tool.

In a refinement, the at least one LWD tool comprises a plurality of tools including a resistivity imaging tool and a resistivity mapping tool, and the initial reservoir model is modified using LWD measurement from both the resistivity imaging and resistivity mapping tools.

Another method of three-dimensionally characterizing a reservoir while drilling a high angle or horizontal wellbore through the reservoir is disclosed. This method includes providing an initial reservoir model for the reservoir. A section of the reservoir model for a planned trajectory of the wellbore is extracted and tool response modeling is performed for at least part of the planned trajectory. An area of interest is identified where correlation between the initial reservoir model and tool response modeling is low. The area of interest is logged with a LWD tool to provide a plurality of measurements. The initial reservoir model is modified or substituted for with a new model by: a) selecting another geologic model and defining a set of parameters for the area of interest based on sensitivities of the LWD tool measurements to provide a modeled result; b) comparing the modeled result with the tool measurements; c) if the modeled result and tool measurements do not agree to within a predetermined tolerance level, selecting another possible geologic model or modifying the selected geologic model and repeating parts (a) and (b) until the modeled result and tool measurements agree within the predetermined tolerance level.

In a refinement, parts (a) and (b) are repeated for all geologic models and a best candidate model is selected based on correlations between the tool measurements and modeled results for each geologic model.

In another refinement, the initial reservoir model is updated using information from the best candidate model.

Another method of three-dimensionally characterizing a reservoir while drilling a high angle or horizontal wellbore through the reservoir. In this method, instead of changing the reservoir model through modeling (applying a modeling algorithm), an inversion is carried out for a given model and a subset of invertible parameters. If the inversion does not result in the modeled responses matching the tool response data, the existing model is modified or a new model is selected and the inversion performed again until the modeled responses match the tool response data. Once an inversion is successful, i.e. the data match to within a predetermined tolerance level, the model is added to a list of acceptable models for the reservoir. Multiple models may be run contemporaneously and more than one model may be used to reproduce the measured data.

A system for three-dimensionally characterizing a reservoir while drilling a high angle or horizontal wellbore through the reservoir, the system includes: a reservoir modeling and visualization environment (e.g., a reservoir modeling system such as Schlumberger's PETREL™ system); and forward modeling library; an inversion algorithm library; a high performance computing (HPC) center 203 linked to the reservoir modeling 205 and physics-based forward modeling and inversion libraries 202 and a logging control station 4 located remotely or even at a wellsite; the logging control station 4 including a display for displaying two and three dimensional models of the wellbore during drilling for geo-steering purposes. In a refinement, the libraries are distributed on a network (see V. Polyakov, T. Habashy, R. Kocian, J. Pabon, and B. Anderson, "Interactive Log Simulation and Inversion on the Web," paper SPE-90909, Proceedings of the 80th SPE Annual Technical Conference and Exhibition, Houston, Tex., Sep. 26-29, 2004, p. 11) located remotely from the wellsite and communication between the wellsite and computing servers running the physics-based modeling and inversion libraries 202 occurs over the Internet.

In another refinement, the reservoir model library comprises two and three dimensional modeling codes for electromagnetic (EM), acoustic, fluid flow and nuclear tools.

In another refinement, the inversion algorithm library comprises deterministic and probabilistic inversion algorithms.

In another refinement, the HPC infrastructure 201 with a plurality of computing resources on the network, local (Intranet) or global (Internet), is linked to a plurality of wellsites and the HPC infrastructure 201 comprises parallelization, scheduling and load-balancing for the computing of multiple algorithms, insuring optimal use of all available computing resources.

Further, in a refinement, the HPC infrastructure 201 may include a one or more of subsystems selected from the group consisting of computing clusters, multi-processor shared memory systems, multiple-core personal computers, and multiple operating systems.

Other advantages and features will be apparent from the following detailed description when read in conjunction with the attached drawings.

BRIEF DESCRIPTION OF THE DRAWINGS

For a more complete understanding of the disclosed methods and apparatuses, reference should be made to the embodiment illustrated in greater detail on the accompanying drawings, wherein.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION OF THE PRESENTLY PREFERRED EMBODIMENTS

Figure 1:
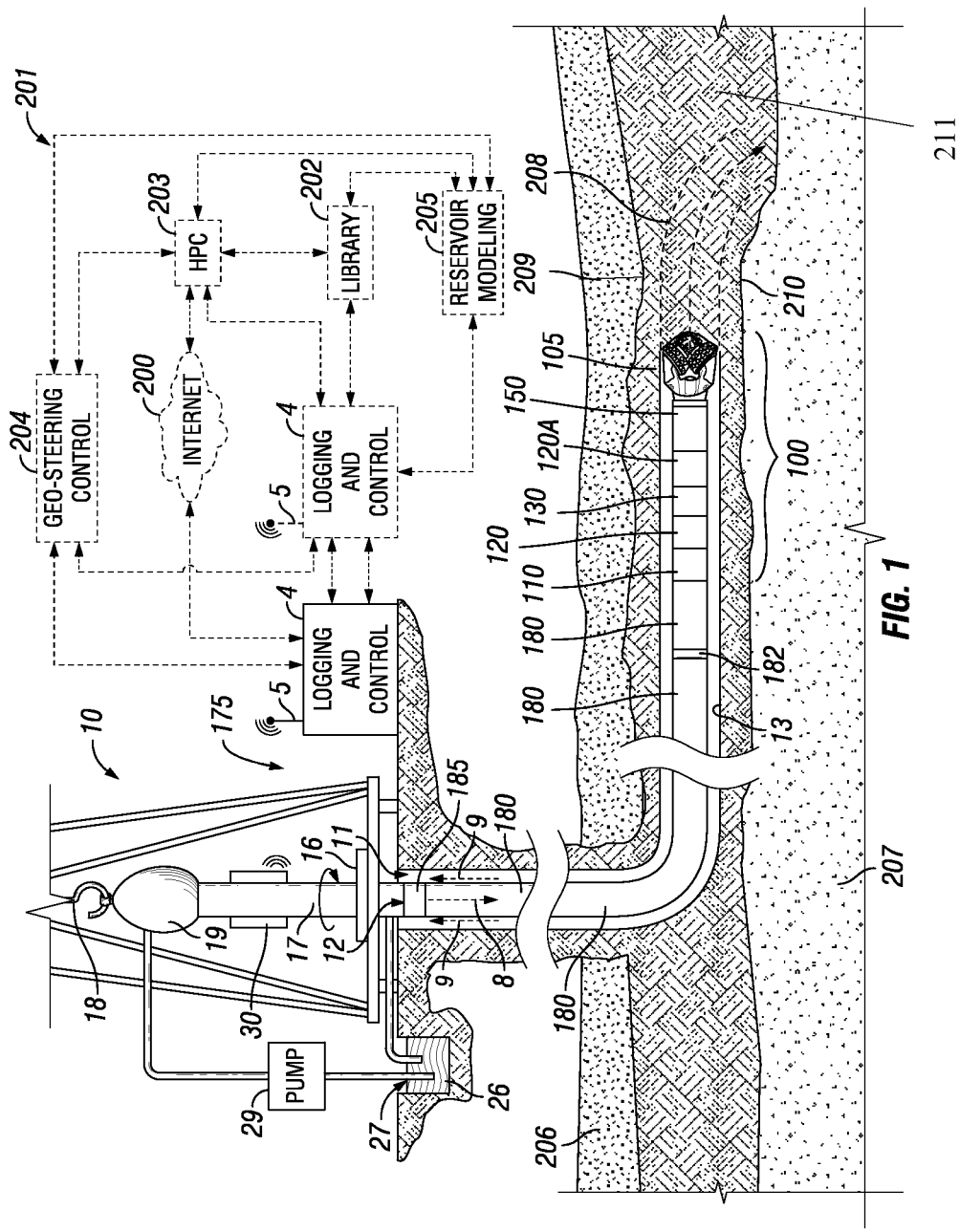
FIG. 1 illustrates, partially in schematic and block form, a wellsite system and HPC infrastructure in which the disclosed methods and systems can be employed.

FIG. 1 illustrates a wellsite system in which the disclosed modeling and inversion methods for enhanced well placement of high angle/horizontal (HA/HZ) wellbores can be employed. The wellsite can be onshore or offshore. In this exemplary system, a borehole 11 is formed in subsurface formations by directional rotary drilling in a manner that is well known.

A drill string 12 is suspended within the borehole 11 and has a bottom hole assembly (BHA) 100 which includes a drill bit 105 at its lower end. The surface system includes platform and derrick assembly 10 positioned over the borehole 11 and the assembly 10 includes a rotary table 16, kelly 17, hook 18 and rotary swivel 19. The drill string 12 is rotated by the rotary table 16, energized by means not shown, which engages the kelly 17 at the upper end of the drill string 12. The drill string 12 is suspended from a hook 18, attached to a traveling block (also not shown), passes through the kelly 17 and the rotary swivel 19 permits rotation of the drill string 12 relative to the hook. As is well known, a top drive system could alternatively be used.

The surface system of FIG. 1 further includes drilling fluid or mud 26 stored in a pit 27 formed at the well site. A pump 29 delivers the drilling fluid 26 to the interior of the drill string 12 via a port in the swivel 19, causing the drilling fluid 26 to flow downwardly through the drill string 12 as indicated by the directional arrow 8. The drilling fluid 26 exits the drill string 12 via ports in the drill bit 105, and then circulates upwardly through the annulus region between the outside of the drill string 12 and the wall 13 of the borehole 11, as indicated by the directional arrows 9. In this known manner, the drilling fluid 26 lubricates the drill bit 105 and carries formation cuttings up to the surface, or the cuttings are removed from the drilling fluid 26 before it is returned to the pit 27 for recirculation.

The bottom hole assembly 100 includes a logging-while-drilling (LWD) module 120, a measuring-while-drilling (MWD) module 130, a roto-steerable system and motor, and drill bit 105. The LWD module 120 is housed in a special type of drill collar, as is known in the art, and can contain one or a plurality of known types of logging tools. It will also be understood that more than one LWD and/or MWD module can be employed, e.g., as represented at 120A. References, throughout, to a module at the position of 120 can alternatively mean a module at the position of 120A as well. The LWD module 120 includes capabilities for measuring, processing, and storing information, as well as for communicating with the surface equipment. The LWD module 120 includes a directional resistivity measuring device, such as one of the Schlumberger PERISCOPE™ directional deep imaging 360° resistivity mapping tools and one of the Schlumberger GEOVISION™ resistivity at the bit imaging tools.

The MWD module 130 is also housed in a special type of drill collar, as is known in the art, and can contain one or more devices for measuring positional and directional data for the drill string and drill bit. The MWD tool 130 may also include an apparatus (not shown) for generating electrical power to the downhole system, such as a mud turbine generator powered by the flow of the drilling fluid. Other power and/or battery systems may be employed. The MWD module 130 may include one or more of the following types of measuring devices: a weight-on-bit measuring device, a torque measuring device, a vibration measuring device, a shock measuring device, a stick slip measuring device, a direction measuring device, and an inclination measuring device.

In the system of FIG. 1, a drill string telemetry system is employed which, in the illustrated embodiment, comprises a system of inductively coupled wired drill pipes 180 that extend from a surface sub 185 to an interface sub 110 in the bottom hole assembly 100. Depending on factors including the length of the drill string, relay subs or repeaters can be provided at intervals in the string of wired drill pipes, an example being shown at 182. The interface sub 110 provides an interface between the communications circuitry of the LWD and MWD modules 120, 130 and the drill string telemetry system which, in this embodiment, comprises wired drill pipes with inductive couplers 180. The wired drill pipes 180 can be coupled with an electronics subsystem 30 that rotates with kelly 17 and includes a transceiver and antenna that communicate bidirectionally with antenna and transceiver of logging and control unit 4 which includes the uphole processor subsystem. As noted below and shown in FIG. 1, the control unit 4 may be remote from the wellsite. In FIG. 1, a communication link 175 is schematically depicted between the electronics subsystem 30 and antenna 5 of the logging and control unit 4. Accordingly, the configuration of FIG. 1 provides a communication link from the logging and control unit 4 through communication link 175, to surface sub 185, through the wired drill pipe telemetry system, to downhole interface 110 and the components of the bottom hole assembly 110 and, also, the reverse thereof, for bidirectional operation.

While a logging and control unit 4 at the wellsite is shown, an alternative logging and control unit 4 is shown in phantom that is remote from the wellsite, as wellsite logging and control units are not necessary with today's high performance wireless and satellite communications. The surface units may be linked to one or more surface interfaces using a wired or wireless connection via one or more communication lines. The communication topology between the surface interface and the surface system can be point-to-point, point-to-multi-point or multipoint-to-point. The wired connection includes the use of any type of cables or wires using any type of protocols (serial, Ethernet, etc.) and optical fibers. The wireless technology can be any kind of standard wireless communication technology, such as IEEE 802.11 specification, Bluetooth, zigbee or any non-standard RF or optical communication technology using any kind of modulation scheme, such as FM, AM, PM, FSK, QAM, DMT, OFDM, etc. in combination with any kind of data multiplexing technologies such as TDMA, FDMA, CDMA, etc.

The communications link 175 may also be routed over the Internet 200 to a high processing computing center 203 that is linked to the logging control station 4 either directly or through the Internet 200 as shown in FIG. 1. The HPC center 203 may also be part of the logging and control station 4. The HPC center 203 may also comprise or be linked directly or indirectly to a library or database 202 that comprises a plurality of two-dimensional and three-dimensional geologic models such as two-dimensional and three-dimensional modeling codes for use with electromagnetic, acoustic, fluid flow and nuclear tool measurements. The database 202 may also comprise a plurality of deterministic and/or probabilistic inversion algorithms. The logging control station 4 may also be linked directly or indirectly to a geo-steering control station 204 that may also be linked directly or indirectly to the HPC center 203.

As shown in FIG. 1, the wellbore 11 has been directionally drilled to enter a horizontal or high angle formation reservoir 211 disposed between upper and lower layers 206, 207 respectively. The planned wellbore trajectory is shown at 208. The methods, techniques and systems disclosed herein are intended to enhance the ability to geo-steer the drill bit 105 through the layer 211 without penetrating the upper or lower boundaries 209, 210.

The disclosed 3D EM modeling methods can be used for horizontal wellbores such as the wellbore 11 of FIG. 1 as well as for conventional interpretation of vertical and deviated wellbores. The disclosed modeling methods can used in pre-drilling planning, while drilling for pro-active geo-steering post-drilling analysis and model refinement for improved reservoir characterization in vertical, deviated, high-angle, and horizontal wells.

The presence of a fault can cause a wrong estimate of distance to boundaries in proximity of the fault, if simple three-layer inversion model is used. However, using the disclosed modeling methods, sub-seismic faults can be identified during drilling, and the interpretation is refined based on 2.5D modeling including the fault and layering. Sensitivities of LWD measurements can be analyzed through 3D modeling while drilling; proving that bit resistivity may be used for fault identification and to estimate apparent dip angles. The disclosed modeling methods also demonstrate consistent apparent dip estimate from directional EM and bit resistivity measurements. Combination of these measurements reduces the uncertainty in structure interpretation.

Measurement sensitivities to invaded fracture swarms of different density (frequency) can be evaluated using the disclosed 3D modeling methods. The disclosed modeling results demonstrate that cross-bedding in the presence of a nearby boundary does not significantly affect the symmetrized directional measurements, although a nearby boundary may have considerable impact on individual measurements used in symmetrization.

The components of a HPC infrastructure 201 for well log modeling and inversion for well placement and 3D petro-physics for HA/HZ well formation evaluation are illustrated schematically in FIG. 1. The library or database 202 comprises computationally intensive 3D applications for EM, acoustic, fluid flow, nuclear tool modeling. Various deterministic and probabilistic inversion algorithms are included in the library or database 202 as well. The HPC infrastructure 201 preferably features parallelization in multi-cluster environments. A HPC computing lab or center 203 is therefore shown only schematically in FIG. 1 as the HPC center lab may be distributed over several locations, similar to the case for the logging and control 4. If disposed remotely from the wellsite 10, the HPC center 203 may be easily accessed by the logging engineer working at the logging control 4 or by the geo-steering engineer working at the geo-steering control 204. Further, the modeling and inversion library 202 may be a "distributed" component or modular component and the added to the logging control 4 software or geo-steering control 204 software. For example, the HPC center 203 and library 202 may form part of a system supporting drilling visualization software and petro-physics evaluation software such as Schlumberger's PETREL™ system. Such a reservoir modeling system is shown schematically at 205 in FIG. 1.

Figure 2:
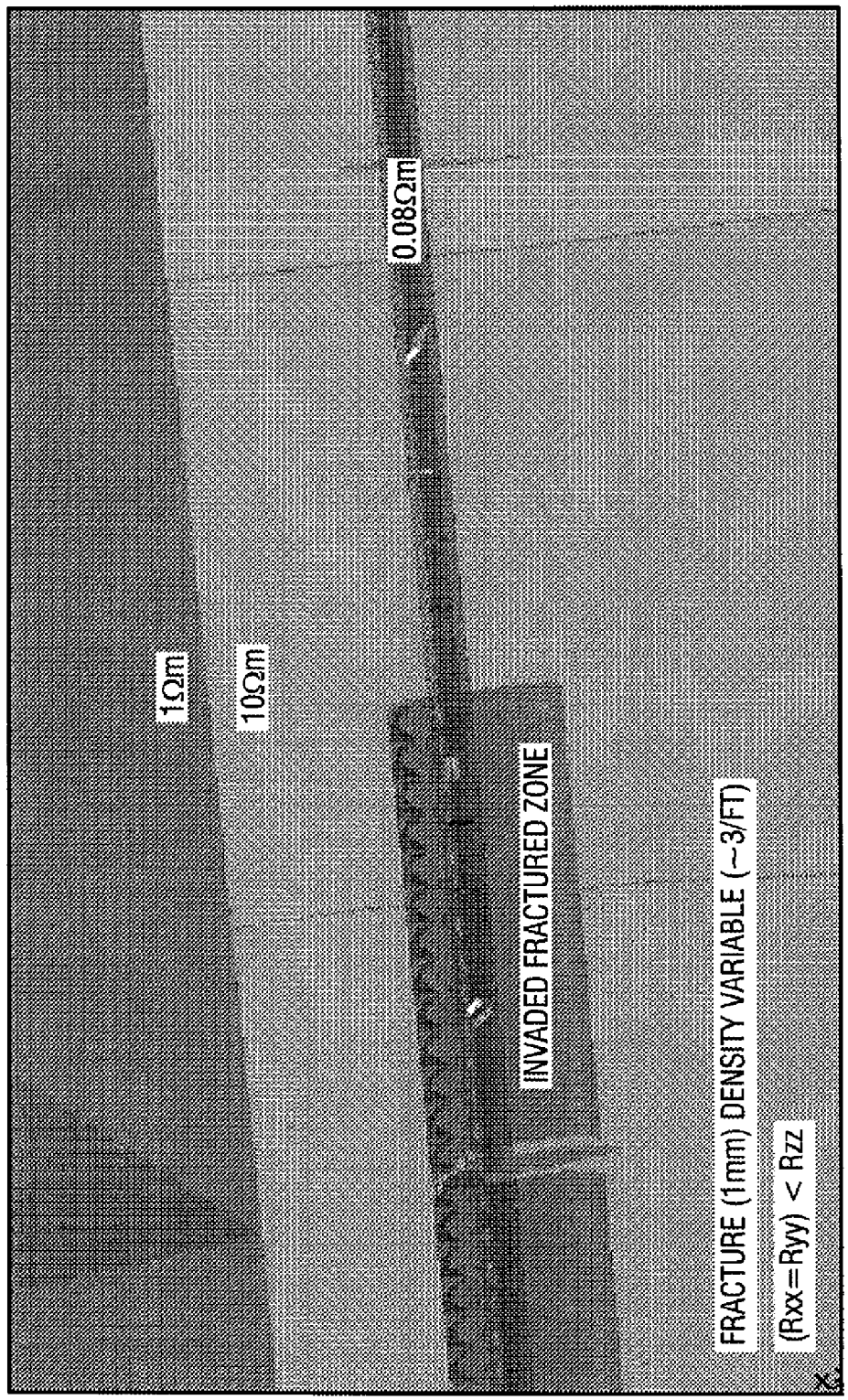
FIG. 2 illustrates, graphically and schematically, a wellbore section with fractures that would be ideally suited for the enhanced modeling while drilling techniques disclosed herein.

In a first embodiment, a disclosed technique starts with a seismic reservoir model in PETREL™ software used for while drilling visualization of well path in reservoir 3D structure, as well as visualization and integration of all measurement and drilling data. Then, a section of the reservoir model is extracted for a given well trajectory 208 and that is the depth of investigation of the tool or tools 120, 130, 120A. Tool response modeling is performed for a given interval of the wellbore trajectory 208. A "domain of interest" or an area of interest of the model is identified where statistical uncertainty is high between tool response modeling and the initial reservoir model. Possible changes in the model are identified that are not present in the original reservoir model, such as borehole fluid invasion effects, including the shape of the borehole, invasion profile, anisotropy, cross-bedding, sub-seismic faults, etc. Various parameters assigned to the area of interest include, but are not limited to: parameters relating to nearby boundaries including position, their dip and azimuth for flat boundary or shape of the boundaries; parameters relating to upper and lower layers and their properties (resistivity or conductivity, transversely isotropic (TI) anisotropy, or generally anisotropic medium with the anisotropy dip and azimuth); parameters relating to nearby faults including their position, dip and azimuth or general shape; parameters relating to borehole fluid invasion size and shape (e.g., potentially tear-drop invasion); parameters relating to the wellbore including its size, shape, mud properties (e.g., mud resistivity or petro-physical parameters, such as water saturation $S_w$ or porosity $\phi$); and nearby fractures including position and orientation (see FIG. 2). Then, the sensitivities of tool responses to a subset of the set of parameters are examined by performing modeling for a range of these parameters. Next, the most sensitive parameters and corresponding measurements are identified. Based on the identified sensitivities, a list of real-time measurements to be used for pro-active well placement are identified. Preferably, characteristic patterns, such as signatures of responses to changes in the subset of parameters, are identified. Optionally, a data base of measurement responses to be used in real-time well placement is generated, which can, for example, replace a simple 1D layered model. Also, based on measurement sensitivity, a subset of measurements least sensitive to fine features is identified, to be used in real-time interpretation. For example, low frequency measurements and directional attenuation are least sensitive to small variations in conductivity, and therefore these measurements can be used to identify boundaries with high contrast further away from the wellbore.

Figure 3:
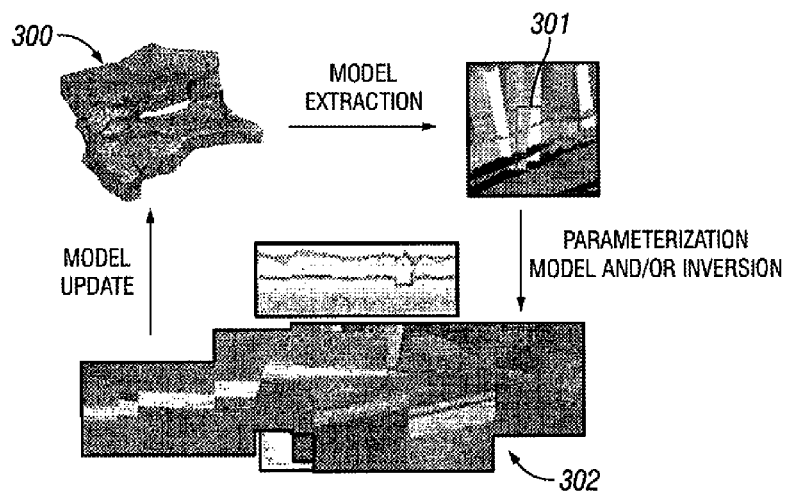
FIG. 3 is a flow diagram illustrating, schematically, a disclosed modeling while drilling method.
Figure 4A:
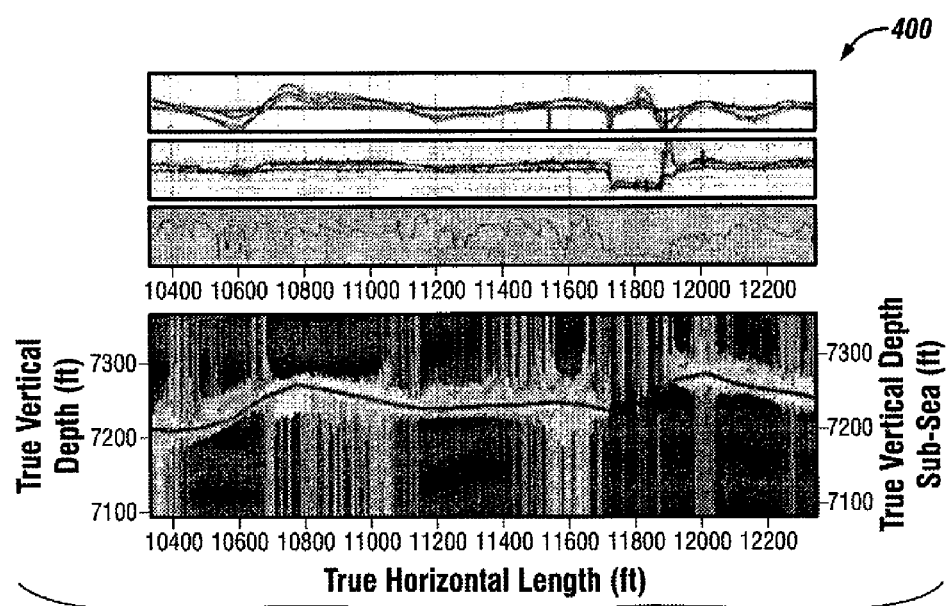
FIGS. 4A-4C illustrate a comparison of the results of a prior art 2D modeling method (4A) with the results of a disclosed modeling method (4B-4C).
Figure 4B:
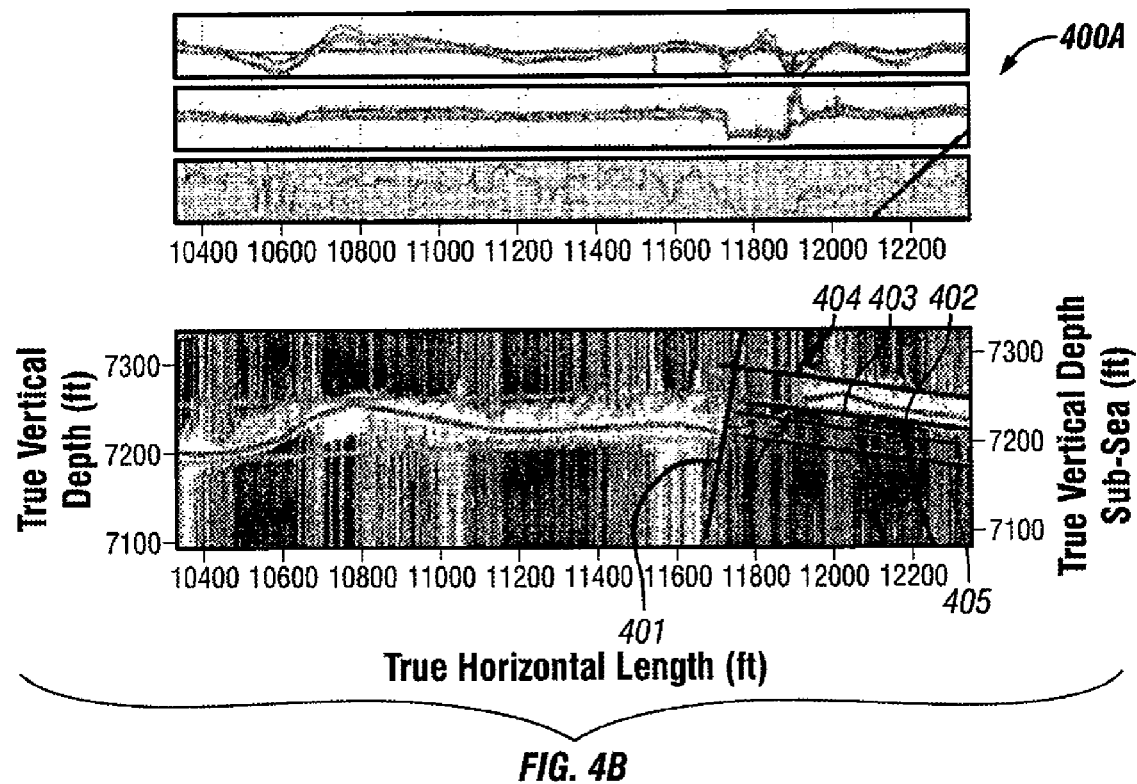
Figure 4C:
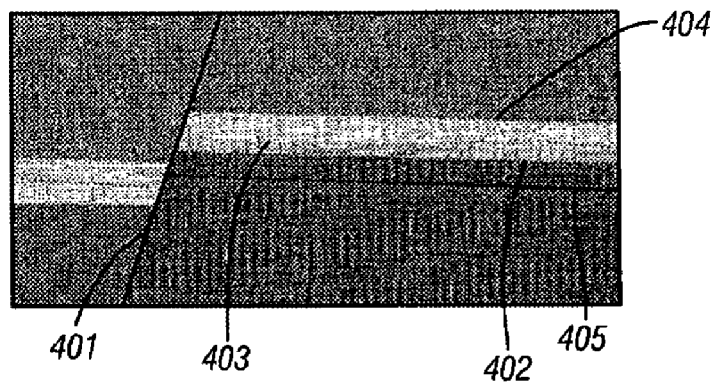

As indicated in FIG. 3, an initial model 300 is selected, a portion 301 of the planned trajectory is extracted, and tool responses are used to parameterize and modify the original model at 302 for purposes of updating or changing the original model 300. This process can be used while drilling to continuously update and improve the accuracy of the reservoir model. In FIG. 4A, a conventional 2D model is disclosed while in FIG. 4B, the 2D model 400a is updated using the improved modeling techniques disclosed herein which establish accurate locations of the fault 401 and layer boundaries 402-405 illustrated in FIG. 4C.

In a second embodiment, a model update feature is based on 2D/3D forward modeling. In this embodiment, an existing (e.g. seismic) reservoir model in PETREL™ is used. Then, a section of the reservoir model for a given well trajectory that is also defined by the tool depth of investigation is extracted. The extracted model may be in the form of curtain section for 2D model, a Pillar grid for a 3D models, or a general corner point grid. Tool response modeling is performed for a given interval of the trajectory. A "domain of interest" or an area of interest is identified for part of the model from that needs refinement, i.e. where there is mismatch between modeled data and tool measurements. Potential geologically feasible models are identified that may be appropriate for the given area of interest. Parameters for the area of interest are identified and defined. Such parameters include, but are not limited to: parameters relating to nearby boundaries including position, their dip and azimuth for flat boundary or shape of the boundaries; parameters relating to upper and/or lower layers and their properties such as resistivity or conductivity, TI anisotropy, or generally anisotropic medium with the anisotropy dip and azimuth; parameters relating to nearby faults such as their position, dip and azimuth or general shape; parameters relating to oil-water contact (OWC) or gas-oil contact (GOC); parameters relating to the wellbore such as mud, casing, cement, etc.

Optionally, sensitivities of tool responses to the identified parameters are examined and the sensitive parameters to be varied are identified. Then, one or more model parameters are changed to define a new model that is based on sensitivity of the tool measurements.

The tool responses are modeled over the area of interest and compared to the actual tool responses. If the modeled responses do not match the actual tool responses, the model is changed or a different geologic model is tried until a the modeled responses match the tool responses to a predetermined level of accuracy. In a refinement, all models may be tested and compared for purposes of selecting a best candidate model. Further, the initial reservoir model is preferably updated by integrating the geologic model that matches the actual tool responses into the initial reservoir model. Alternatively a model selection algorithm may be employed. Updating the initial reservoir model include: changing the position or shape of local boundaries; changing the position or shape of local faults; changing upper and/or lower layer properties; changing cell properties; defining local heterogeneity in a reservoir cell such as sub-gridding or dividing the existing cell and defining a property distribution throughout the divided cell; inserting a new layer boundary; inserting a new fault; defining new contacts (OWC or GOC), and combinations thereof.

In a third embodiment, instead of changing the model parameters and performing additional modeling, an inversion of the selected geologic model and a subset of the parameters that are invertible is performed. If the inversion is unsuccessful, i.e., the modeled responses do not match the tool response data, the selected geologic model is modified in the inversion for the modified model and a subset of the invertible parameters is performed again. When the inversion is successful, i.e., the modeled responses match the tool response data, the geologic model or modified geologic model is added to a list of acceptable models for the reservoir being evaluated. Preferably, similar to the second embodiment, all models are compared and a "best candidate model" is selected. Also, a model selection algorithm may be employed. Preferably, the initial reservoir model is updated by integrating information from the best candidate model.

In the fourth embodiment, a combination of well placement tools may be employed such as an azimuthal resistivity imaging tool (e.g., Schlumberger's GEOVISION™ resistivity imaging tools or resistivity at the bit (RAB) tools) and curtain section imaging tools (e.g., Schlumberger's PERISCOPE™ deep imaging resistivity tools). The multiple tool responses are used to refine the reservoir models.

In a fifth embodiment, multiple tool measurements are employed and statistical uncertainties from processing on different scales are used to build a consistent model that integrates large-scale three-dimensional Earth modeling with uncertainties.

In a sixth embodiment, a high-performance computing (HPC) infrastructure 201 is disclosed for modeling and inversion processing for enhanced well-placement and high angle/horizontal (HA/HZ) well formation evaluation involving three-dimensional petro-physics. In this embodiment, a modeling and inversion library 202 is provided that may include 2D and 3D modeling codes (e.g. for EM, acoustic, fluid flow, nuclear modeling) as well as a database of deterministic and probabilistic inversion algorithms. The HPC infrastructure 201 preferably includes parallelization, scheduling and load-balancing of coarse-grained algorithms. The HPC infrastructure 201 can also be adapted for multi-cluster, multi-core PC and multi-OS environments. The library 202 may be distributed or stored directly at the logging control station 4 or geo-steering control station 204 or remote access to the library 202 may be provided through the Internet, intranet, extranet, LAN or other suitable means. Preferably, the HPC infrastructure 201 is modular in nature, enabling components to be added on without requiring redesign or reprogramming.

In a seventh embodiment, the disclosed methods and system is used for pre-drilling modeling, post-drilling analysis as well as real-time interpretation for pro-active geo-steering. Preferably, access to reservoir models and inversion algorithms as well as web-based processing can be provided through a web browser—to model or invert well placement tool responses. The well log modeling and inversion may run remotely on clusters of computers or on a computer grid.

In an eighth embodiment, a reservoir model update based on 2D/3D forward modeling from the reservoir modeling environment is provided. In this embodiment, an existing reservoir modeling framework is employed to perform well log modeling and inversion during all three stages of drilling a well—pre-drilling, real-time and post-drilling analysis/update. Again, the modeling and inversion algorithms may be run remotely on computing clusters or on a computer grid.

While only certain embodiments have been set forth, alternatives and modifications will be apparent from the above description to those skilled in the art. These and other alternatives are considered equivalents and within the spirit and scope of this disclosure and the appended claims.

What is claimed:

1. A method for defining logging while drilling measurements to be used for proactive well placement while drilling a high angle or horizontal wellbore in a reservoir, the method comprising:
    providing an initial reservoir model for the reservoir;
    extracting a section of the reservoir model for a planned trajectory of the wellbore;
    generating, using a computer, a secondary model by performing secondary modeling for at least part of the planned trajectory;
    identifying, using the computer, an area of interest within the secondary model where statistical uncertainty is high;
    defining possible causes of the statistical uncertainty in the area of interest within the secondary model that are not present in the initial reservoir model;
    defining a set of parameters for the area of interest based on the possible causes of statistical uncertainty;
    modeling, using the computer, logging tool responses in the area of interest for at least one logging while drilling tool;
    evaluating, using the computer, sensitivities of the modeled logging tool responses to a subset of the set of parameters by generating and assessing at least one tertiary model for a range of the subset of parameters;
    identifying, using the computer, which parameters correlate to greatest sensitivities in the modeled logging tool responses from the subset of parameters and corresponding logging while drilling measurements; and
    defining, using the computer, one or more logging while drilling measurements to be used for proactive well placement along the planned trajectory based on the parameters that correlate to the greatest sensitivities in the modeled logging tool responses.

2. The method of claim 1, further comprising:
    identifying characteristic patterns of the modeled logging tool responses to changes in the subset of parameters;
    generating a data base of measurement responses to be used in real-time well placement based on measurement sensitivity; and
    defining a subset of measurements while drilling to be used in real-time interpretation as the wellbore is drilled though the reservoir.

3. The method of claim 1, wherein the defined possible causes of statistical uncertainty comprise one or more nearby bed boundaries or nearby faults and the set of parameters is selected from the group consisting of position, dip and azimuth for nearby boundaries, and shape of nearby non-parallel boundaries or nearby faults.

4. The method of claim 1, wherein the defined possible causes of statistical uncertainty comprise one or more nearby formation layers and the set of parameters is selected from the group consisting of resistivity, transversely isotropic (TI) anisotropy, anisotropy dip, and azimuth for the one or more nearby formation layers.

5. The method of claim 1, wherein the defined possible causes of statistical uncertainty comprise wellbore fluid invasion and the set of parameters is selected from the group consisting of radial depth of wellbore fluid invasion, cross sectional shape of wellbore fluid invasion profile, and wellbore fluid properties.

6. The method of claim 1, wherein the defined possible causes of statistical uncertainty comprise wellbore properties and the set of parameters is selected from the group consisting of wellbore size, wellbore shape, wellbore fluid resistivity, water saturation (Sw) and porosity, presence of casing, presence of casing and cement, and quality of cement bond between casing and formation.

7. The method of claim 1, wherein the defined possible causes of statistical uncertainty comprise one or more nearby fractures and the set of parameters is selected from the group consisting of position, orientation, and properties of the one or more nearby fractures and wherein the extracted section is one-dimensional, two-dimensional or three dimensional.

8. The method of claim 1, wherein the extracted section is defined by a depth of investigation of the logging while drilling tool.

9. The method of claim 1, wherein the generating of the secondary model further comprises performing tool response modeling on at least part of the planned trajectory.

10. The method of claim 1, wherein the area of interest within the secondary model is further characterized as an area where the logging while drilling tool responses do not match the secondary model.

11. The method of claim wherein the defining of possible causes of the statistical uncertainty in the area of interest within the secondary model and the defining of the set of parameters for the area of interest based on the possible causes of statistical uncertainty further comprises selecting the tertiary model from the group consisting of nearby bed boundaries, nearby formation layers, nearby faults, properties of wellbore fluid invasion, oil water contact (OWC), gas oil contact (GOC), wellbore properties and nearby fractures, wherein the tertiary model is not present in the secondary model.

12. The method of claim 1, further comprising selecting the tertiary model from a plurality of other models by:
    a) executing one of the other models for the range of the subset of parameters to generate a first result;
    b) changing at least one of the parameters that correlate to the greatest sensitivities in the modeled logging tool responses;
    c) executing the one of the other models for the range of the subset of changed parameters to generate a second result;
    d) comparing the first and second results;

e) if the first and second results do not agree to within a predetermined tolerance level, selecting another model from the other models and repeating parts (a) through (d) until the first and second results agree within the predetermined tolerance level.

13. The method of claim 12, further comprising modifying the initial reservoir model by incorporating the selected tertiary model therein.

14. The method of claim 13, wherein the modifying of the initial reservoir model further comprises at least one change selected from the group consisting of: changing a position or shape of a formation layer boundary; changing a position or shape of a fault; changing a layer property; changing a cell property; defining a heterogeneity in the area of interest; inserting new boundaries; inserting new faults; defining a new oil-water contact; and defining a new gas-oil contact.

15. The method of claim 1, wherein the initial reservoir model is a seismic reservoir model.

16. The method of claim 1, wherein the at least one logging while drilling tool comprises a resistivity imaging tool or an electromagnetic boundary mapping tool.

17. The method of claim 16, wherein the at least one logging while drilling tool comprises a plurality of tools including a resistivity imaging tool and a resistivity mapping tool, and
wherein the initial reservoir model is modified using measurements from both the resistivity imaging and resistivity mapping tools.

18. A method for defining logging while drilling measurements to be used for proactive well placement while drilling a high angle or horizontal wellbore in a reservoir, the method comprising:
providing an initial reservoir model for the reservoir;
extracting a section of the reservoir model for a planned trajectory of the wellbore;
generating, using a computer, a secondary model by performing secondary modeling for at least part of the planned trajectory;
identifying, using the computer, an area of interest within the secondary model where statistical uncertainty is high;
defining possible causes of the statistical uncertainty in the area of interest within the secondary model that are not present in the initial reservoir model;
defining a set of parameters for the area of interest based on the possible causes of statistical uncertainty;
logging the area of interest with at least one logging while drilling tool to produce logging while drilling tool responses;
evaluating, using the computer, sensitivities of the produced logging while drilling tool responses to a subset of the set of parameters by generating and assessing at least one tertiary model for a range of the subset of parameters;
identifying, using the computer, which parameters correlate to greatest sensitivities in the produced logging while drilling tool responses from the subset of parameters and corresponding logging while drilling measurements; and
defining, using the computer, one or more logging while drilling measurements to be used for proactive well placement along the planned trajectory based on the parameters that correlate to the greatest sensitivities in the produced logging while drilling tool responses.

19. The method of claim 18, further comprising:
identifying characteristic patterns of the produced logging while drilling tool responses to changes in the subset of parameters;
generating a data base of measurement responses to be used in real-time well placement based on measurement sensitivity; and
defining a subset of measurements while drilling to be used in real-time interpretation as the wellbore is drilled though the reservoir.

20. The method of claim 18, wherein the defined possible causes of statistical uncertainty comprise one or more nearby bed boundaries or nearby faults and the set of parameters is selected from the group consisting of position, dip and azimuth for nearby boundaries, and shape of nearby non-parallel boundaries or nearby faults.

21. The method of claim 18, wherein the defined possible causes of statistical uncertainty comprise one or more nearby formation layers and the set of parameters is selected from the group consisting of resistivity, transversely isotropic (TI) anisotropy, anisotropy dip and azimuth for the one or more nearby formation layers.

22. The method of claim 18, wherein the defined possible causes of statistical uncertainty comprise wellbore fluid invasion and the set of parameters is selected from the group consisting of radial depth of wellbore fluid invasion, cross sectional shape of wellbore fluid invasion profile, and wellbore fluid properties.

23. The method of claim 18, wherein the defined possible causes of statistical uncertainty comprise wellbore properties and the set of parameters is selected from the group consisting of wellbore size, wellbore shape, wellbore fluid resistivity, water saturation (Sw) and porosity, presence of casing, presence of casing and cement, and quality of cement bond between casing and formation.

24. The method of claim 18, wherein the defined possible causes of statistical uncertainty comprise one or more nearby fractures and the set of parameters is selected from the group consisting of position, orientation, and properties of the one or more nearby fractures.

25. The method of claim 18, wherein the extracted section is defined by a depth of investigation of the logging while drilling tool.

26. The method of claim 18, wherein the generating of the secondary model further comprises performing tool response modeling on at least part of the planned trajectory.

27. The method of claim 18, wherein the area of interest within the secondary model is further characterized as an area where the logging while drilling tool responses do not match the secondary model.

28. The method of claim 27, wherein the defining of possible causes of the statistical uncertainty in the area of interest within the secondary model and the defining of the set of parameters for the area of interest based on the possible causes of statistical uncertainty further comprises selecting the tertiary model from the group consisting of nearby bed boundaries, nearby formation layers, nearby faults, properties of wellbore fluid invasion, oil water contact (OWC), gas oil contact (GOC), wellbore properties and nearby fractures.

29. The method of claim 18, further comprising selecting the tertiary model from a plurality of other models by:
a) executing one of the other models for the range of the subset of parameters to generate a first result;
b) changing at least one of the parameters that correlate to the greatest sensitivities in the produced logging while drilling tool responses;
c) executing the one of the other models for the range of the subset of changed parameters to generate a second result;
d) comparing the first and second results;

e) if the first and second results do not agree to within a predetermined tolerance level, selecting another model from the other models and repeating parts (a) through (d) until the first and second results agree within the predetermined tolerance level.

30. The method of claim 29, further comprising modifying the initial reservoir model by incorporating the selected tertiary model therein, wherein the modifying of the initial reservoir model further comprises at least one change selected from the group consisting of: changing a position or shape of a formation layer boundary; changing a position or shape of a fault; changing a layer property; changing a cell property; defining a heterogeneity in the area of interest; inserting new boundaries; inserting new faults; defining a new oil-water contact; and defining a new gas-oil contact.

31. The method of claim 18, wherein the initial reservoir model is a seismic reservoir model.

32. The method of claim 18, wherein the at least one logging while drilling tool comprises a resistivity imaging tool or an electromagnetic boundary mapping tool.

33. The method of claim 32, wherein the at least one logging while drilling tool comprises a plurality of tools including a resistivity imaging tool and a resistivity mapping tool, and
wherein the initial reservoir model is modified using measurements from both the resistivity imaging and resistivity mapping tools.

34. A system for three-dimensionally characterizing a reservoir while drilling a high angle or horizontal wellbore through the reservoir, the system comprising:
a reservoir modeling and visualization environment;
a reservoir forward modeling library;
an inversion algorithm library;
a high performance computing (HPC) infrastructure linked at least to the reservoir forward modeling library, the inversion library, and a well placement or formation evaluation station; wherein
the well placement or formation evaluation station comprises a display for displaying two and three dimensional models of the wellbore before drilling, during drilling for geo-steering purposes, and after drilling for refinement of a reservoir model;
wherein the system is configured to perform the method of claim 1 or claim 18.

35. The system of claim 34, wherein the reservoir forward modeling library comprises two and three dimensional modeling codes for electro-magnetic (EM), acoustic, fluid flow and nuclear tools.

36. The system of claim 34, wherein the inversion algorithm library comprises deterministic and probabilistic inversion algorithms.

37. The system of claim 34, wherein the HPC infrastructure is linked to a plurality of logging control centers located at a plurality of sites and the HPC infrastructure comprises parallelization, scheduling and load-balancing for computing of multiple algorithms.

38. The system of claim 34, wherein the HPC infrastructure comprises one or more subsystems selected from the group consisting of computing clusters, multiple-core personal computers, and multiple operating systems.

39. The system of claim 34, wherein the reservoir modeling and visualization environment is web-browser based.

* * * * *